United States Patent [19]

Hanke et al.

[11] 3,774,735

[45] Nov. 27, 1973

[54] HYDRODYNAMIC RETARDER FOR VEHICLES

[75] Inventors: Hans Hanke; Wolfgang Peter, both of Stuttgart, Germany

[73] Assignee: Daimler-Benz Aktiengesellschaft

[22] Filed: Jan. 17, 1972

[21] Appl. No.: 218,222

[30] Foreign Application Priority Data
Jan. 16, 1971  Germany............... P 21 02 078.0

[52] U.S. Cl.................. 188/296, 60/337, 60/339, 60/347, 277/59, 415/112
[51] Int. Cl. ........................................... F16d 57/02
[58] Field of Search.................... 188/290, 296; 277/59; 415/112; 60/337, 339, 347

[56] References Cited
UNITED STATES PATENTS

| 3,146,863 | 9/1964 | Herbenar et al............... | 188/290 X |
| 1,737,870 | 12/1929 | Telfer .......................... | 415/112 X |
| 3,330,386 | 7/1967 | Bertram et al................. | 188/296 |
| 3,373,847 | 3/1968 | Rohacs ......................... | 188/290 X |

Primary Examiner—George E. A. Halvosa
Attorney—Paul M. Craig, Jr. et al.

[57] ABSTRACT

A hydrodynamic retarder for vehicles, especially motor vehicles which includes an internal working circulation between a rotating and a stationary bladed wheel within a working space and an external cooling circulation with a by-pass valve; the filling of the working circulation takes place from a filling cylinder actuated by pressure medium and controlled by a control valve, for example by the brake pedal; the sealed space located directly in front of the shaft seal within the retarder housing is relieved toward a place of the working circulation that is pressureless during operation while a supply tank for working liquid is provided which is connected with the cooling circulation by way of a first check valve that opens in the direction toward the cooling circulation and with the relief line, connecting the space in front of the shaft seal with the working space, by way of a second check valve which closes in the direction toward the relief line.

31 Claims, 1 Drawing Figure

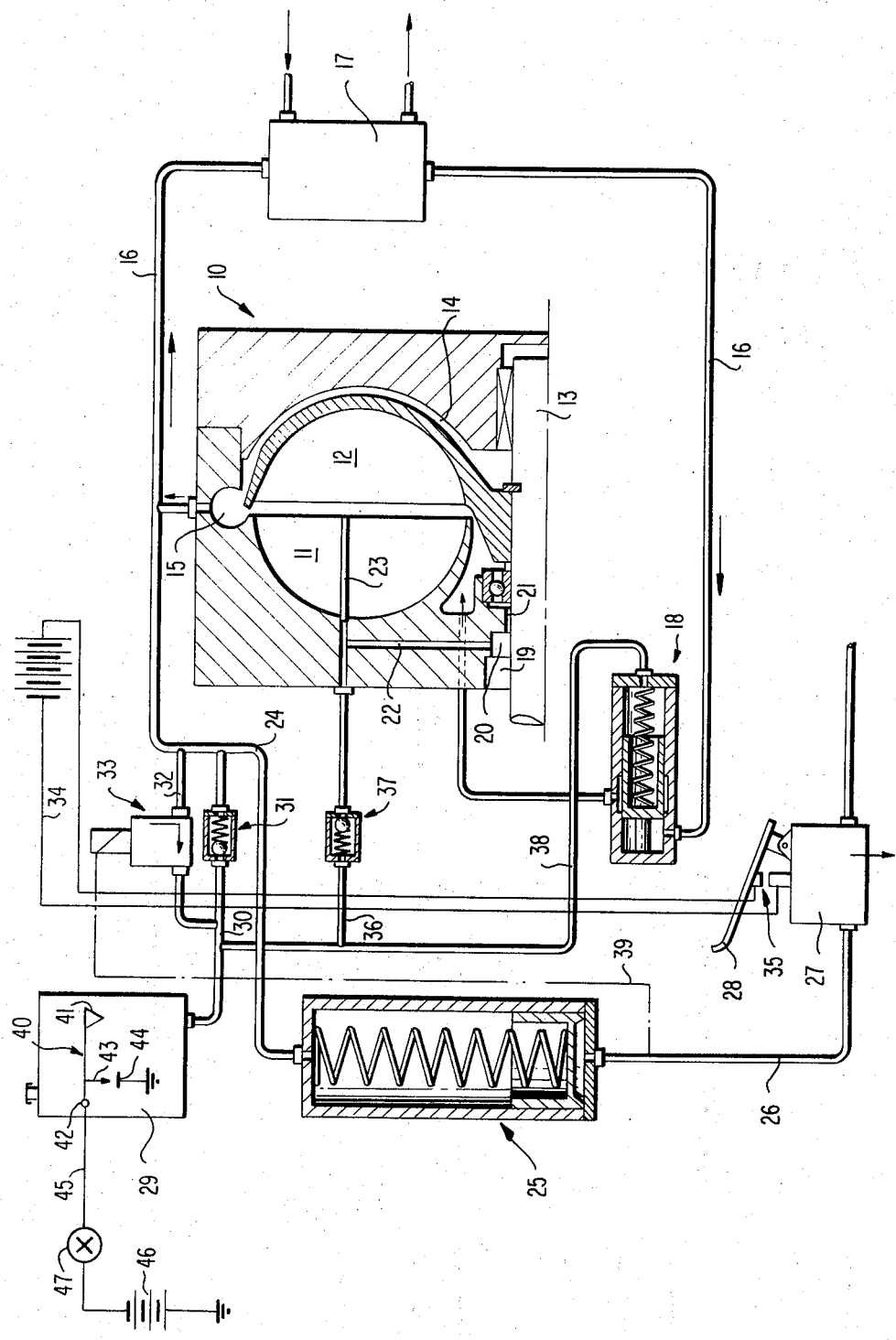

HYDRODYNAMIC RETARDER FOR VEHICLES

The present invention relates to a hydrodynamic retarder for vehicles, especially motor vehicles, including an internal working circulatory system between at least one rotating blade wheel and at least one stationary blade wheel within a working space and an external cooling circulatory system with a by-pass valve and possibly a cooler whereby the filling of the working circulatory system takes place from a filling medium cylinder actuated by a pressure medium and controlled by a control valve, for example, the brake pedal, and whereby the sealed space directly in front of the shaft seal within the retarder housing is relieved toward a place in the working circulatory system which is pressureless during operation.

It has already been proposed to construct a hydrodynamic retarder in the aforementioned manner. In contradistinction to retarders with a filling pump, very short filling periods and a very accurate metering of the brake moment to be obtained can be achieved thereby. Additionally it is avoided by the construction according to this prior proposal that the sael is overloaded and possibly can even be pushed out.

The present invention is concerned with a further development of this arrangement, advantageous as such. In particular, it is to be achieved by the present invention that in case of leakage losses in the system, no reduction of the filling quantity and as a result thereof no reduction of the brake moment occurs during a repeating of the braking operation. Additionally, it is to be achieved in a simple manner that also during standstill the seal cannot be pushed out upon actuation of the control valve. The last-mentioned problem has already been solved also in the prior proposal, however, the solution of this prior proposal requires a connection back with the actuating pedal which purely from a structural point of view leads to considerable changes and to a further space requirement.

The underlying problems are solved according to the present invention with retarders of the aforementioned type in that a supply tank of reservoir for working fluid is provided which is connected with the cooling circulatory system by way of a first check valve opening in case of flow in the direction toward the cooling circulatory system and with the relief line by a second check valve closing in case of flow in the direction toward the relief line. It is thereby particularly appropriate if according to a further development of the inventive concept the supply tank is so arranged that its level is located above the retarder and filling cylinder.

With the retarder proposed in accordance with the present invention an adequate braking effect can also be still realized when a slight leakage loss occurs in the system, or if air should have penetrated into the system as a result of a vacuum. Furthermore, a "pushing-out" of the seal in standstill is impossible in the arrangement according to the present invention whereby the operating realiability and safety is increased.

A further proposal of the present invention is to the effect that a two-way valve be arranged in parallel with the first check valve, constructed as relief valve, between the supply tank and the cooling circulatory system, which two-way valve in the idling position of the retarder is open and is adapted to be closed in dependence on the braking operation shortly before or at the latest when the filling cylinder responds. It is achieved thereby that the possibly excessive fluid quantity can flow off without resistance into the supply tank.

The control of this two-way valve can take place by conventional means in a pneumatic, mechanical or similar manner. However, the present invention thereby prefers a solution according to which a solenoid valve is provided as two-way valve, closing when energized by a current flow, in the energizing circuit of which is connected a switch closing upon actuation of the control valve for the filling cylinder. This switch is preferably located therefore at the brake pedal and responds earlier than the reducing valve to be actuated by the brake pedal for the actuation of the filling cylinder. In another embodiment of the present invention the side of the filling cylinder actuated by the pressure medium is connected with the control member of the two-way valve. This control member may be constructed, for example, as diaphragm and may act on the two-way valve either directly or indirectly, for example, again by way of an electric switch.

A further feature of the present invention resides in that the spring of the first check valve, i.e., preferably of the relief valve is so selected and adjusted that also with a closed two-way valve a flow of working fluid from the supply tank into the filling cylinder is possible. Furthermore, it is additionally proposed that the spring of the second check valve is adjusted to the maximum permissive pressure for the seal or to a value slightly below the same.

According to a further development of the inventive concept the spring side of the by-pass valve arranged in the cooling circulatory system is connected with the line between the second check valve and the supply tank. An eventual pressure build-up at the by-pass valve is avoided with certainty in this manner and above all the leakage fluid is fed back to the supply tank and is made re-usable in this manner.

Furthermore, provision is additionally made in accordance with the present invention that the filling cylinder is constructed as piston or diaphragm accumulator actuated by pressurized air and is combined into a structural unit together with the supply tank as well as with the two check valves and the two-way valve. The operating safety and reliability of the installation can be still further increased if according to the present invention a conventional float is arranged in the supply tank and is connected with a switching device in such a manner then that a warning signal disposed within the field of view of the driver is lighted up when the liquid level drops below a minimum value. Of course, in lieu of or in addition to this optical warning installation also an acoustic warning installation may be provided with approximately the same means.

Accordingly, it is an object of the present invention to provide a hydrodynamic retarder for vehicles, especially for motor vehicles which avoids by simple means the aforementioned shortcomings and drawbacks encountered in the prior art.

Another object of the present invention resides in a hydrodynamic retarder in which no reduction of the filling quantity and consequently no reduction of the braking moment occurs when the braking operation is repeated, notwithstanding leakage losses in the system.

A further object of the present invention resides in a hydrodynamic retarder for vehicles, especially motor vehicles, in which a pushing-out of the seal during standstill upon actuation of the control valve is effectively precluded.

A still further object of the present invention resides in a hydrodynamic retarder system for vehicles which is simple from a structural point of view and minimizes the space requirements.

Another object of the present invention resides in a hydrodynamic retarder for vehicles, especially motor vehicles which excels by exceptionally high operating safety.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic view, partially in cross section, of a hydrodynamic retarder for vehicles in accordance with the present invention.

Referring now to the single figure of the drawing, the retarder generally designated by reference numeral 10 includes as stator a stationary blading 11 and as rotor a rotating blading 12 which is driven from the drive shaft 13. The working space 14 of the retarder 10 is provided at the outer circumference with a scroll case 15, to which is connected the external circulation 16 that again terminates at the inner circumference in the working space 14 and into which are connected the cooler 17 of conventional construction and the by-pass valve generally designated by reference numeral 18. The by-pass valve 18 interrupts the external cooling circulatory system 16 when the latter is pressureless so that the external cooling circulation cannot empty itself.

The shaft 13 is sealed with respect to the retarder housing by a seal 19 of conventional construction. A space 20 is disposed directly in front of the seal 19, which is sealed with respect to the working space 14 by a further contact-free seal 21 of conventional type. This space 20 is relieved by way of the bores 22 and 23 toward a place of the working space 14, where no pressure prevails also during operation. For that purpose the relief bore 23 must terminate above the center point of the vertical center section of the working space 14 in such a manner that this vertical center section is subdivided in the radial direction approximately at the ratio of 8:5.

The external circulatory system 16 is connected by way of a line 24 with the filling cylinder generally designated by reference numeral 25 which is supplied with compressed air from a reducing valve 27 by way of the line 26; the reducing valve 27, in turn, is actuated by the brake pedal 28. The line 24 serves both for the purpose of filling as also for the purpose of emptying or discharging the cooling circulation 16 as well as of the working space 14. The filling cylinder 25 is constructed as spring-loaded piston accumulator.

The arrangement described so far is either known as such in its details or has already been proposed before and therefore does not form any part of the present invention.

In addition to the filling cylinder 25 a supply tank or reservoir 29 is provided in the installation according to the present invention which is appropriately so arranged that its liquid level lies above the retarder 10 and the filling cylinder 25. This supply reservoir 29 is connected by means of the line 30 and by way of the relief valve generally designated by reference numeral 31 with the filling and discharge line 24. A solenoid valve generally designated by reference numeral 33 which closes when energized by current, is connected in parallel to the check valve 31 within a line 32. The relief valve 31, as to the rest, is so constructed that it permits a flow from the supply tank 29 into the line 24 whereas it essentially blocks the return-flow.

A switch 35 coordinated to the brake pedal 28 is arranged in the energizing circuit 34 of the solenoid valve 33. The energizing winding (not shown) of the solenoid valve 33 therefore receives current during the actuation of the brake pedal 28, and the valve 33 closes. This closing takes place shortly before or at the latest during the pressure build-up at the filling cylinder 25 so that in practice the line 32 is already closed when the filling cylinder 25 feeds by way of the line 24 into the cooling circulation 16 and the working space 14.

A further branch line 36 branches off from the line 30 between the supply reservoir 29 and the relief valve 31. This further line 36 leads to the relief bore 23 by way of a second check valve generally designated by reference numeral 37. This check valve 37 permits a flow from the relief bore 23 in the direction toward the supply tank 29 whereas it blocks a flow in the opposite direction. The spring-loaded side of the by-pass valve 18 is connected by way of the line 38 with the line 36 between the check valve 37 and the supply reservoir 29.

It should be mentioned that the spring force at the relief valve 31 is so adjusted that also with a closed solenoid valve 33 the filling cylinder 25 is able to fill itself by suction effect from the supply tank 29 by way of the lines 30 and 24. This means this spring is relatively weak. In contradistinction thereto, at the check valve 37 the spring is so adjusted that it lies below the maximum pressure of the seal 19 or at most attains the same.

During standstill of the vehicle the working space 14 is empty or pressureless. The by-pass valve 18 is thereby in the illustrated closing position. The filling cylinder 25 is filled with working liquid. If now the brake pedal 28 is actuated inadvertently or, for example, for purposes of testing, then at first the solenoid valve 33 is closed and immediately thereafter the working space 14 is placed under pressure in the usual manner from the filling cylinder 25 by way of the line 24. This pressure can be relieved from the space 20 arranged in front of the seal 19 by way of the relief bores 22 and 23 as well as the check valve 37 and the line 36 in the direction toward the supply tank 29 so that the seal 19 under no circumstances is damaged or pushed out.

A closing of the line 32, as to the rest, can also be achieved if in lieu of the solenoid valve 33 and in lieu of the energizing circuit 34 appertaining thereto, a valve actuated by pressure medium is provided whose control member, for example, a diaphragm is connected by way of the line 39 indicated in dash and dot lines with the line 26 between the filling cylinder 25 and the reduction valve 27.

During operation of the vehicle the starting condition is again the same as described above, i.e., the working space 14 is empty and pressureless. If now the brake pedal 28 is again actuated, then the solenoid valve 33 is closed in the manner already described and a predetermined pressure build-up corresponding to the position of the brake pedal 28 is achieved from the filling cylinder 25 in the working space 14. As a result thereof a predetermined filling and consequently also a predetermined brake moment is adjusted. The working fluid thereby circulates constantly in the external circulatory system 16 because as a result of the pressure within the same the by-pass valve 18 is now open. If in this condition the pressure from the filling cylinder is taken away, i.e., if the actuation of the brake pedal 28 stops, then the retarder 10 will be emptied by way of the line 24 as a result of centrifuging action and the filling cylinder 25 again is filled.

It may now happen that leakage losses occur at the retarder 10 or in the cooling circulation 16. In this case, the constant filling quantity of the filling cylinder 25 would then no longer suffice to completely fill the retarder 10 and the cooling circulation 16 so that only a smaller brake moment could be still absorbed. In case of further leakage losses this condition would continuously deteriorate. However, this is prevented in the system of the present invention in that during each emptying of the working circulation 14 and of the cooling circulation 16 the filling cylinder 25 fills itself again completely out of the supply tank 29 by suction action by way of the relief valve 31 and the lines 30 and 24. Consequently, the completely filled filling cylinder 25 is again available during the next braking operation. The check valve 31 and the solenoid valve 33 assure that during the braking the filling of the filling cylinder 25 is, in fact, supplied to the working space 14 and to the cooling circulation 16 and is not received, for example, in the supply tank 29.

The supply tank 29 may also be provided with a conventional float generally designated by reference numeral 40 for indicating when the liquid level thereof drops below a predetermined level. The float 40 includes a float member 41 pivotally mounted at 42 and a contact 43 adapted to make a ground connection with ground terminal 44 when the minimum liquid level is reached. A warning device, such as a lamp 47 or acoustic device is connected in a circuit 45 including the switch contact 43 and a voltage supply source 46 connected with one terminal to ground so that when the switch contact 43 establishes a ground connection with terminal 44, the lamp 47 starts to light up.

While we have shown and described only one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What we claim is:

1. A hydrodynamic retarder installation comprising:
   a brake housing;
   at least one fixed blade wheel and one rotatable blade wheel arranged in spaced facing relationship to one another in said housing;
   a working fluid circulatory system for supplying working fluid to a working chamber formed between said fixed and rotatable blade wheels to effect braking of a shaft connected to said rotatable blade wheel;
   brake actuating means for controlling said supply of working fluid to said working chamber;
   a shaft seal interposed between said housing and said shaft to limit escape of working fluid from said housing along said shaft;
   first conduit means for directly communicating the core of said working chamber with a seal space between said housing and said shaft which is sealed off by the shaft seal such that the low pressure experienced at said core during supply of working fluid with a rapidly rotating shaft relieves said shaft seal;
   supply tank means containing a supply of working fluid;
   second conduit means for communicating said supply tank means with said working fluid circulatory system by way of a first check valve means which permits flow through said second conduit means from said supply tank means to said working fluid circulatory system and which prevents flow through said second conduit means from said working fluid circulatory system to said supply tank means, whereby working fluid can be supplied to said working fluid circulatory system by way of said first check valve means without backflow from said working fluid circulatory system to said supply tank means through said second conduit means;
   and third conduit means for communicating said supply tank means with said first conduit means by way of a second check valve means which prevents flow through said third conduit means from said supply tank means in a direction toward said core and seal space and which permits flow through said third conduit means from said core and seal space to said supply tank means, whereby an excessive pressure build-up in said seal space is automatically limited by said second check valve means permitting fluid flow from said seal space to said supply tank means.

2. A retarder installation according to claim 1, further comprising an external cooling circulatory means having a cooler and a by-pass valve means, said cooling circulatory means being connected to said working fluid circulatory system for cooling the working fluid.

3. A retarder installation according to claim 1, characterized in that the second check valve means includes a spring which is adjusted at most to the maximum permissive pressure of the seal means.

4. A retarder installation according to claim 1, characterized in that a float means is arranged in the supply tank means which is so connected with a switch means that a warning signal appears in the field of vision of the driver when the liquid level in the supply tank means drops below a predetermined minimum level.

5. A retarder installation according to claim 6, further comprising an external cooling circulatory means having a cooler and a by-pass valve means, said cooling circulatory means being connected to said working fluid circulatory system for cooling the working fluid.

6. A retarder installation according to claim 1, wherein the brake actuating means includes a filling cylinder means actuable in response to a pressure medium and control valve means for controlling the pressure medium for actuating said filling cylinder means.

7. A retarder installation according to claim 6, wherein the supply tank means is positioned with the level of working fluid therein normally above both the working chamber and the filling cylinder means.

8. A retarder installation according to claim 7, characterized in that a two-way valve means is arranged between the supply tank means and the cooling circulatory means in parallel to the first check valve means, said two-way valve means being open in the idling non-braking position of the retarder installation and being operable to be closed as a function of the braking operation at the latest upon response of the filling cylinder means.

9. A retarder installation according to claim 8, characterized in that the two-way valve means is closed in dependence of the braking operation shortly before the response of the filling cylinder means.

10. A retarder installation according to claim 8, characterized in that the first check valve means is constructed as relief valve.

11. A retarder installation according to claim 8, characterized in that a solenoid valve is provided as the two-way valve means which closes upon energization thereof and which includes an energizing circuit provided with a switch closing upon actuation of the control valve means for the filling cylinder means.

12. A retarder installation according to claim 8, characterized in that the two-way valve means includes a control member and in that a side of the filling cylinder means actuated by the pressure medium is connected with the control member of the two-way valve means.

13. A retarder installation according to claim 8, characterized in that the first check valve means includes a spring which is so adjusted that a flow and refilling of working liquid from the supply tank means into the filling cylinder means is possible also with a closed two-way valve means.

14. A retarder installation according to claim 13, characterized in that the second check valve means includes a spring which is adjusted at most to the maximum permissive pressure of the shaft seal.

15. A retarder installation according to claim 14, characterized in that the spring of the second check valve means is adjusted slightly below the maximum permissive pressure of the shaft seal.

16. A retarder installation according to claim 14, characterized in that the spring side of the by-pass valve means is connected with a line between the second check valve means and the supply tank means.

17. A retarder installation according to claim 14, characterized in that a spring side of the by-pass valve means is connected with a line between the second check valve means and the supply tank means.

18. A retarder installation according to claim 17, characterized in that the supply tank means as well as the two check valve means and the two-way valve means are combined into a structural unit.

19. A retarder installation according to claim 18, characterized in that the filling cylinder means is constructed as a piston accumulator actuated by compressed air.

20. A retarder installation according to claim 18, characterized in that the filling cylinder means is constructed as a diaphragm accumulator actuated by compressed air.

21. A retarder installation according to claim 18, characterized in that a float means is arranged in the supply tank means which is so connected with a switch means that a warning signal appears in the field of vision of the driver when the liquid level in the supply tank means drops below a predetermined minimum level.

22. A retarder installation according to claim 21, characterized in that a solenoid valve is provided as the two-way valve means which closes upon energization thereof and which includes an energizing circuit provided with a switch closing upon actuation of the control valve means for the filling cylinder means.

23. A retarder installation according to claim 21, characterized in that the two way-valve means includes a control member and in that a side of the filling cylinder means actuated by the pressure medium is connected with the control member of the two-way valve means.

24. A retarder installation according to claim 6, wherein said control valve means is controlled by brake pedal means.

25. A retarder installation according to claim 24, further comprising an external cooling circulatory means having a cooler and a by-pass valve means, said cooling circulatory means being connected to said working fluid circulatory system for cooling the working fluid.

26. A retarder installation according to claim 25, characterized in that a two-way valve means is arranged between the supply tank means and the cooling circulatory means in parallel to the first check valve means, said two-way valve means being open in the idling non-braking position of the retarder installation and being operable to be closed as a function of the braking operation at the latest upon response of the filling cylinder means.

27. A retarder installation according to claim 26, characterized in that the two-way valve means is closed in dependence of the braking operation shortly before the response of the filling cylinder means.

28. A retarder installation according to claim 26, characterized in that a solenoid valve is provided as the two-way valve means which closes upon energization thereof and which includes an energizing circuit provided with a switch closing upon actuation of the control valve means for the filling cylinder means.

29. A retarder installation according to claim 26, characterized in that the two-way valve means includes a control member and in that the side of the filling cylinder means actuated by the pressure medium is connected with the control member of the two-way valve means.

30. A retarder installation according to claim 26, characerized in that the first check valve means includes a spring which is so adjusted that a flow and refilling of working liquid from the supply tank means into the filling cylinder means is possible also with a closed two-way valve means.

31. A retarder installation according to claim 26, characterized in that the supply tank means as well as the two check valve means and the two-way valve means are combined into a structural unit.

* * * * *